May 3, 1927.

O. P. R. LEHMANN 1,627,396

PROJECTING MACHINE

Filed Sept. 1, 1923

4 Sheets-Sheet 1

INVENTOR
Otto P. R. Lehmann
BY
ATTORNEYS

May 3, 1927. 1,627,396

O. P. R. LEHMANN

PROJECTING MACHINE

Filed Sept. 1, 1923 4 Sheets-Sheet 2

INVENTOR
Otto P. R. Lehmann
BY
ATTORNEYS

May 3, 1927. 1,627,396
O. P. R. LEHMANN
PROJECTING MACHINE
Filed Sept. 1, 1923 4 Sheets-Sheet 3

INVENTOR
Otto P. R. Lehmann
BY
Niesen Schreck
ATTORNEYS.

May 3, 1927.
O. P. R. LEHMANN
1,627,396
PROJECTING MACHINE
Filed Sept. 1, 1923   4 Sheets-Sheet 4
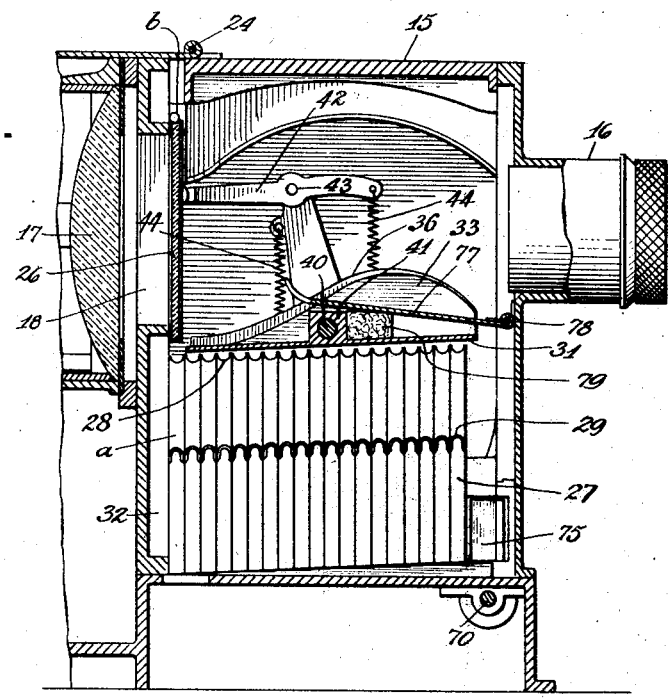
Fig.4.
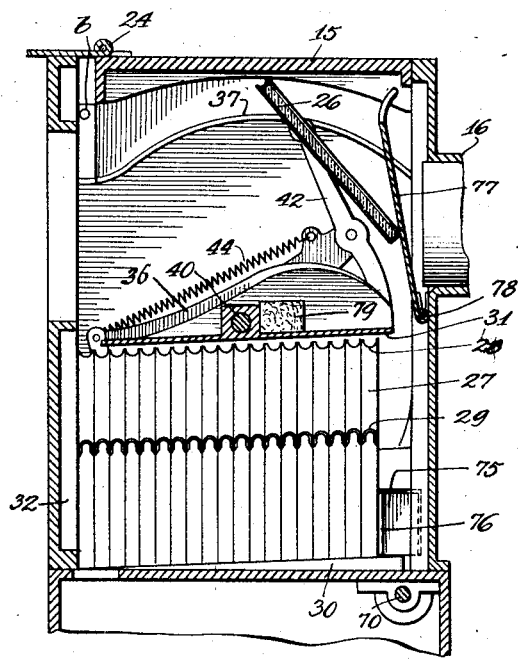
Fig. 6.
Fig. 5.
INVENTOR
Otto P. R. Lehmann
BY
ATTORNEYS Patented May 3, 1927.

1,627,396

UNITED STATES PATENT OFFICE.

OTTO P. R. LEHMANN, OF NEWARK, NEW JERSEY, ASSIGNOR TO VICTOR C. THORNE, OF NEW YORK, N. Y.

PROJECTING MACHINE.

Application filed September 1, 1923. Serial No. 660,467.

My invention relates to projecting machines of the type in which images are projected upon a screen by means of slides and has for its object to provide a novel and efficient mechanism whereby individual slides are automatically brought to and removed from an operative projecting position. Other more specific objects will appear from the description hereinafter.

Figure 1:
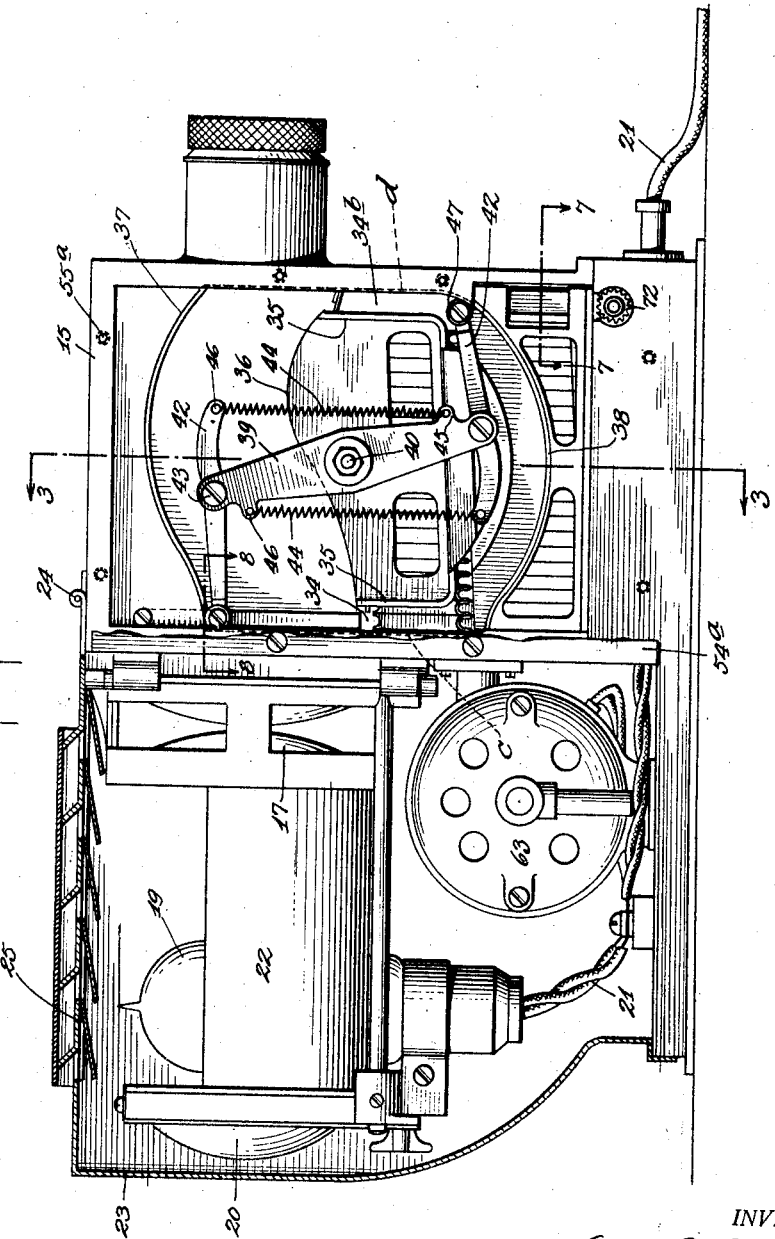
Figure 2:
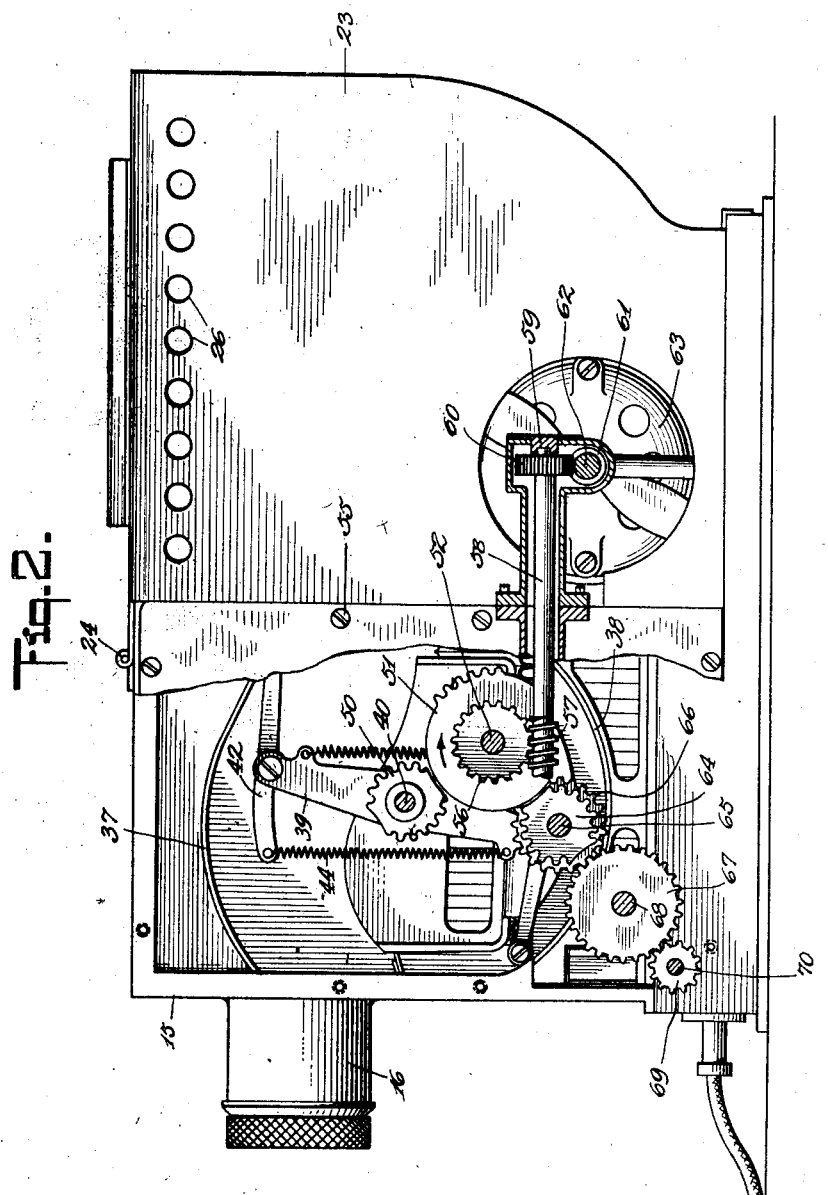
Figure 3:
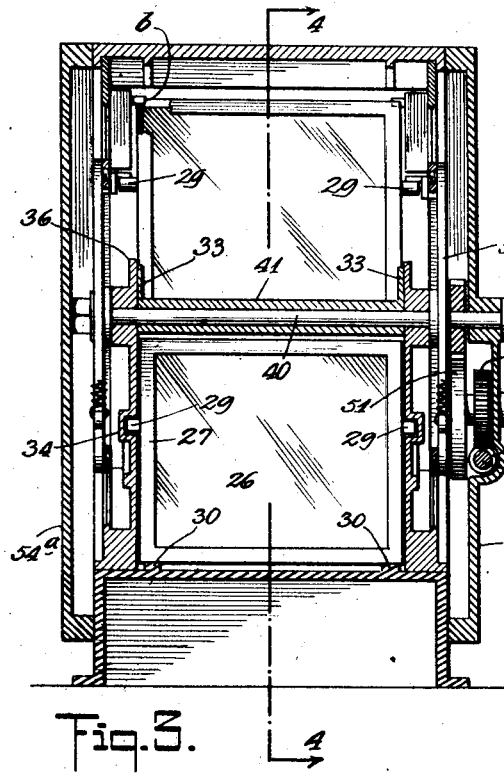
Figure 8:
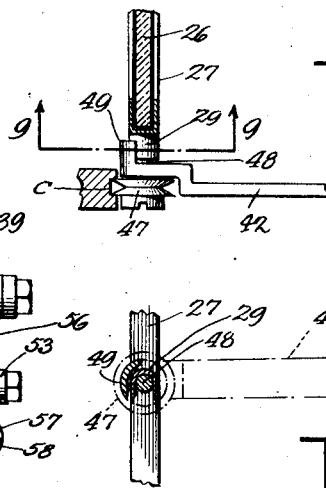
Figure 9:
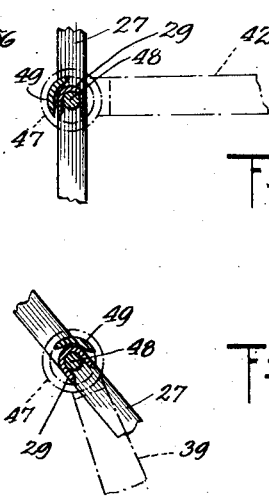
Figure 10:
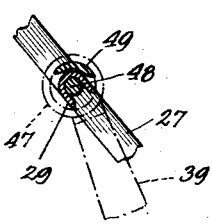
Figure 7:
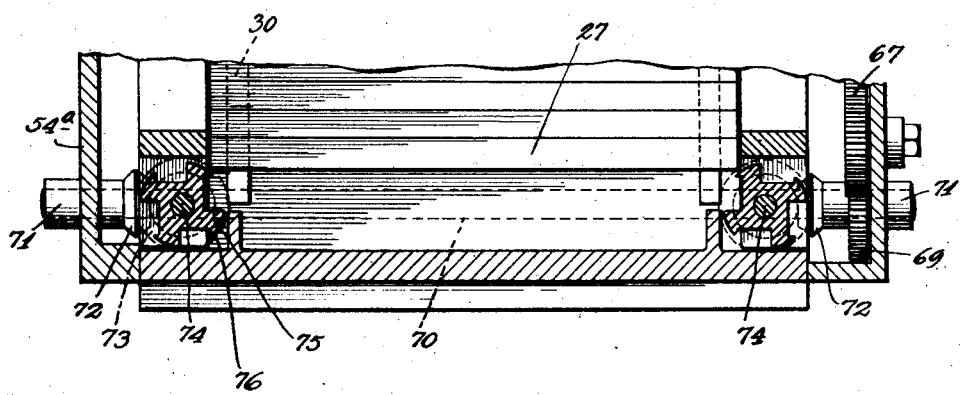

In the accompanying drawings which illustrate an example of the invention without defining its limits, Fig. 1 is a side elevation of the projecting machine with parts in section, Fig. 2 is a similar view looking in the opposite direction; Fig. 3 is a sectional elevation on the line 3—3 of Fig. 1; Fig. 4 is a fragmentary sectional elevation on the line 4—4 of Fig. 3; Figs. 5 and 6 are views similar to Fig. 4 but showing the parts in different positions; Fig. 7 is a fragmentary sectional view on an enlarged scale taken on the line 7—7 of Fig. 1; Fig. 8 is a detail sectional view on the line 8—8 of Fig. 1; Fig. 9 is a detail sectional view on the line 9—9 of Fig. 8 and Fig. 10 is a detail view similar to Fig. 9 but showing the parts in a different position.

As shown in the drawings the projecting machine which is in the nature of a stereopticon, comprises a casing 15 and tube 16 containing the objective in the well known way, which tube may be telescopically constructed for the purpose of adjusting the focus of the machine. The latter further includes condensers 17 arranged in registry with a slide-opening 18 on the one side and with an illuminating means comprising, for instance, an incandescent bulb 19 on the other side. The electric bulb 19 may be located in front of a reflector 20 and receives its current by means of wires 21 connected with a suitable source of electricity. The condenser 17, lighting means 19, and reflector 20, are carried upon a suitable support 22 located behind the casing 15 and preferably enclosed by means of a cover 23 which, as shown, may be hinged at 24 upon the casing 15; the cover 23 as shown in Fig. 1 may be provided with ventilators 25 and with air outlets 26 as illustrated in Fig. 2. As so far described the projecting machine may be of any well known construction and arrangement and may include any features commonly found in stereopticons for projecting slides upon a screen.

In the present instance the slides 26 comprise plates containing the pictures or other images to be projected, which plates themselves may be of any approved or conventional construction and in the present case are fixed in frames 27; the upper edges of the latter are preferably recessed as indicated at 28, said frames being further provided, upon opposite vertical edges, with socket members 29 arranged in registry with each other and having, for instance, an inverted U-shape as shown in Figs. 4 and 6. A plurality of slides 26 are contained in the casing 15 and are arranged in upright contiguous relation to each other at the lower portion thereof as shown in Figs. 4, 5 and 6. If desired, and in order to facilitate advancing of the slides 26 in the manner to be more fully described hereinafter, said frames may be set upon an inclined platform 30 within the casing 15. A plate 31 extends transversely across the casing 15 at a point above the plurality of slides 26 and in parallel relation to the bottom of the casing or to the inclined platform 30 if the latter forms a part of the machine. The plate 31 in co-operation with the bottom of the casing 15 or with the inclined platform 30 as the case may be, constitutes a magazine in which the supply of slides is contained, said plate 31 terminating at a point in registry with the second slide in the magazine so as to leave a free space above the terminal slide $a$ in Fig. 4; this terminal slide $a$ rests against flanges 32 which project from the rear wall of the casing 15 below and in registry with the slide opening 18; the latter as shown in Figs. 4, 5 and 6 is in the form of a flanged rectangle the forward edge of which coincides with the forward edges of the flanges 32. The plate 31 is fixed in position within the casing 15 by means of flanges 33 attached to the casing 15 in any convenient manner. The socket members 29, as shown in Fig. 3, are arranged to travel in guides 34 formed in the casing 15 at appropriate points and arranged in parallel relation to either the bottom of the casing or the inclined platform 30 as the case may be, said guides at their opposite end portions being transversely open as illustrated in Fig. 1 and being continued upwardly to form vertical guides $34^a$ and $34^b$ by means of flanges 35 comprising part of the casing 15. The casing 15 is shaped at predetermined points to form guides 36 as shown in Figs. 1 and 2, the purpose of which will appear more fully hereinafter. Co-operating tracks 37 are located at diametrically opposite points within the upper portion of the casing 15 at a distance above the guides 36 as shown in Figs. 1, 2, 4, 5 and 6; similar tracks 38 are located at diametrically opposite points within the lower part of the casing as shown in Figs. 1 and 2, the purpose of which will also appear more fully hereinafter.

The slide manipulating mechanism comprises levers 39 carried by a shaft 40 rotatably mounted in a bearing 41 extending upwardly from the plate 31, said levers being upon opposite sides of the casing 15 in registry with each other and at their opposite ends are provided with arms 42 pivoted at 43 upon the levers 39 as shown in Fig. 1; coil springs 44 are connected at one end with lugs 45 upon the levers 39 and at their other ends with pins 46 located at one end of each arm 42. At the opposite end each arm is provided with a roller 47 and with a pin 48; in the preferred construction a shield 49 extends from the free end of each arm 39 in parallel relation to and at a distance from the pin 48 thereof as shown in Figs. 8, 9 and 10. The shaft 40 further carries a mutilated gear 50 adapted to mesh with a mutilated gear 51, mounted upon a stub-shaft 52 journalled in a bearing 53 forming part of or secured to a cover 54; the latter is secured upon the casing 15, for instance, by means of screws 55 as shown in Fig. 2. The stub-shaft 52 carries also a worm-gear 56 which meshes with a worm 57 mounted upon or forming part of the driving shaft 58. The latter is mounted in suitable bearings 59 and carries a worm-gear 60 which is in mesh with a worm 61 located upon the shaft 62 of an electric motor 63, whereby motive power is supplied to the apparatus as will appear more fully hereinafter. The mutilated gear 51 is arranged to mesh also with a mutilated gear 64 mounted upon a stub-shaft 65 journalled in the cover 54 and carrying a gear 66 in mesh with a gear 67; the latter is carried by a stub-shaft 68 also mounted upon the cover 54 and meshing with a pinion 69 as shown in Fig. 2. The pinion 69 is carried by a shaft 70 which extends transversely of the casing 15 and is mounted in bearings 71 located respectively upon the cover 54 at one side of the casing and upon a second cover 54ª detachably secured, for instance, by means of screws 55ª upon the opposite side of the casing. The shaft 70 is further provided with bevel pinions 72 which mesh with bevelled gears 73 secured upon upright shafts 74 journalled in bearings 75 within the casing 15. The upright shafts 74 carry devices whereby the plates 26 in the magazine are propelled forwardly in steps, said devices each comprising a plurality of members 75 each of which includes a projection 76, the purposes of which will appear more fully hereinafter.

In addition to the parts so far described the machine may include a shutter 77 pivoted at 78 in the casing 15 and in its normal position resting upon a cushion 79 located upon the plate 31 as shown in Fig. 4; the shutter may be spring-controlled and is so located and arranged as to be capable of being adjusted into registry with the tubes 16 during the operation of the machine.

In practice a plurality of slides 26 are located within the magazine of the casing 15 in the upright manner indicated in Fig. 4, it being understood that at the beginning of the operation all of the slides constituting the supply are located in the magazine. If the motor 63 is now started the shaft 58 will be rotated thereby and through the medium of the worm 57 and worm-gear 56 will rotate the stub-shaft 52 and correspondingly actuate the mutilated gear 51 in the direction of the arrow in Fig. 2; it will be understood that the position of the parts is such at this stage that the mutilated gear 51 will first engage the mutilated gear 50 and thus bring about a rotation of the shaft 40. The levers 39 will accordingly be moved in a circular path and will carry along the arms 42 in such a way as to cause the one set of rollers 47 to travel along the tracks 38 and to finally bring the pins 48 thereof into engagement with the socket members 29 of the terminal slide a. As the actuation of the mechanism continues the arms 39 will be further actuated to exert a lifting action upon the said arms 42 whereby the terminal slide a will be lifted into registry with the slide opening 18 as shown in Fig. 4; the upward movement of the terminal slide a is arrested when the recessed edge 28 of the frame 27 comes into contact with pins b located at proper points in the casing with respect to the slide opening 18 to position successive slides in exact registry therewith. The position of the parts at this stage is clearly indicated in Fig. 4 in which the slide 26 which has been raised in the manner described is in registry with the projecting device and in position to have its image projected upon the screen in the customary manner, the shutter 77 being in its inoperative position as illustrated. At the proper time during the described operations the mutilated gear 51 engages and operates the mutilated gear 64 which, in turn, brings about a rotation of the shaft 65 and gear 66 and correspondingly actuates the gear 67, shaft 68, pinion 69 and shaft 70. The rotation of the latter causes a corresponding movement of the bevel pinions 72 and accordingly rotates the slide advancing devices in such a manner as to cause one of the members 75 of each device to exert a push upon the terminal plate at the other end of the supply in the magazine whereby the entire supply of slides is pushed forwardly to an extent sufficient to replace the plate *a* which has been raised with a new plate *a* as shown in Fig. 4. At the termination of this operation of propelling the supply of slides forwardly in the magazine, a projection 76 of each of the members 75 is located behind the last slide in the magazine in such a manner as shown in Fig. 7 as to prevent the supply of slides from tilting backward. As the operation of the mechanism continues the slide 26 with its frame 27 which occupies the raised position and which has been projected, is tilted to the position shown in Fig. 5; this result is secured by reason of the engagement of the recessed edge 28 of the slide with the pins *b* and because the particular arms 42 at the upper end of the levers 39 exert a pull upon the socket members 29 of the frame of said slide. By this operation the rollers 47 are brought beneath the tracks 37 and the lower edge portion of the slide 26 and its frame 27 are caused to exert a lifting action upon the shutter 77 against the tension of its spring or springs as shown in Fig. 5. A continued operation of the mechanism will cause the rollers 47 to travel along the tracks 37 and will carry the slide to the position shown in Fig. 6 in which the shutter, by the action of said slide, has been brought to a position in front of the tube 16 so as to cut off the same from the source of light 19. A further operation of the mechanism causes the slide to be lowered from the position shown in Fig. 6 downwardly in the guide 34ᵇ and back into the magazine into registry with the supply of slides therein. The pressure of the shutter 77, by the action of its spring or springs, upon the slide positively insures the return thereof to the magazine without interference. During the operation of returning the slide which has been projected, to the magazine, the other arms 42 have been operated in the manner first described to raise a new slide into registry with the slide opening 18 and into position for projection upon the screen; it will be understood that as the slide which has been projected is passed back into the magazine the shutter 77 will return to its inoperative position shown in Fig. 4 by gravity, the cushion 79 serving to prevent noise and to absorb any shocks incident to such return and to thereby prevent injury to the shutter and to the adjacent parts of the machine. As soon as the slide which has been projected is fully returned to the magazine in line with the slides therein, the slide advancing devices will be actuated in the manner previously described to cause the next successive numbers 75 to again advance the supply of slides in said magazine in order to again place a terminal slide in position ready to be raised for projection. In this way successive slides are automatically raised into position for projection and returned to the magazine, the operation being such that while one slide is being returned to the magazine another slide is being raised into operative position.

During the manipulation of the slides from and back to the magazine, the shields 49 on the arms 42 prevent unintentional disengagement of the socket members 29 from the pins 48 as indicated in Figs. 8, 9 and 10.

In order to steady the parts in their movements the rollers 47 may be caused to travel in grooves *c* and *d* as the slides are being respectively raised into operative position and returned to inoperative position back into the magazine; for the same purpose said rollers may be grooved as indicated in Fig. 8 and fitted upon the tracks 37 and 38 respectively, said tracks in such case being bevelled as shown in Fig. 3. During the transfer from the position shown in Fig. 4 of the drawings to the positions shown successively in Figs. 5 and 6, the particular slide 26 and frame 27 are guided between the guides 36 as indicated in Fig. 3.

If desired, a fan 80 may be located upon the shaft 61 of the electric motor for maintaining the condensers 17 and elements adjacent to the lighting means 19 in a cool condition.

The mechanism whereby the slides are alternately raised into inoperative position in the magazine is simple and efficient in operation and automatically exposes the slides for projection in successive and continuous steps requiring no attention on the part of the operator.

While the invention has been illustrated and is primarily intended for use in connection with projecting machines, it will be understood that the mechanism may be adapted for purposes other than those set forth in the description and that the slides 26 and frames 27 are to be construed as representative of other units which may be shifted from a magazine by said mechanism or its equivalent.

The machine may be operated in the ordinary way without slides in the magazine, in which case individual slides would be successively introduced into operative position in the machine through an opening in the top thereof.

Various changes in the specific form shown and described may be made within the scope of the claims without departing from the spirit of my invention.

I claim:

1. In a projecting machine, the combination of projecting means, a magazine, a plurality of framed slides standing on edge in said magazine in upright surface engagement with each other, socket members on the frames of said slides, a pair of rotatable levers, actuating means for rotating said levers, arms at the opposite ends of said levers adapted to engage the sockets of said slides and to raise a slide from said magazine into registry with said projecting means and to coincidentally return a previously raised slide to the magazine, and means operated by said actuating means for advancing said plurality of slides in said magazine in predetermined steps to place successive slides in position to be lifted from said magazine.

2. In a projecting machine, the combination of projecting means, a magazine, a plurality of slides to be projected, frames enclosing said slides and having their upper edges recessed, socket members on opposite edges of said frames, rotatable levers, actuating means for intermittently operating said levers, arms pivotally carried by said levers and arranged to engage said sockets to lift a slide from said magazine into registry with said projecting means and to coincidentally restore a previously raised slide to said magazine, stationary pins co-operating with the recessed edges of said frames to position the slides in registry with the projecting means and to start a slide upon its return to the magazine, rollers on said arms, guiding means co-operating with said rollers to guide said arms in their intended paths during manipulation of said slides, rotatable devices for advancing the plurality of slides and frames in predetermined steps, means combined with said devices for preventing backward tilting of said slides and frames and mechanism connected with said actuating means and intermittently operated thereby to actuate said rotatable devices.

3. The combination of a magazine, a plurality of units therein, socket members on opposite edges of said units, rotatable levers, actuating means for intermittently operating said levers, arms pivotally carried by said levers and arranged to engage said sockets and automatically lift a unit from said magazine, rollers on said arms, guiding means co-operating with said rollers to guide said arms, rotatable devices for advancing said plurality of units in predetermined steps and mechanism connected with said actuating means for intermittently operating said rotatable devices.

4. The combination of a magazine, a plurality of units therein, socket members on opposite edges of said units, rotatable levers, actuating means for intermittently operating said levers, arms pivotally carried by said levers, pins on said arms adapted to engage said sockets and automatically lift a unit from said magazine, shields on said arms for preventing unintentional disengagement of said pins and socket members, rotatable devices for advancing said plurality of units in predetermined steps and mechanism connected with said actuating means for intermittently operating said rotatable devices.

5. In a projecting machine, in combination, a magazine adapted to hold a multiplicity of slides, a slide opening to which said slides are successively carried for display, rotating means engaging the terminal slide and carrying the same to the slide opening, said rotating means during the continuous movement thereof carrying the slide last displayed toward the rear of said magazine, means to tilt the slide during its movement toward the rear of the magazine, said rotating means carrying said slide into the magazine and depositing it after the rearmost slide contained therein, said rotating means during the continued travel thereof engaging the foremost slide and carrying it to the display opening.

6. In a projecting machine, in combination, a magazine adapted to hold a multiplicity of slides, a slide opening to which said slides are successively carried for display, rotating means engaging the terminal slide and carrying the same to the slide opening, said rotating means during the continuous movement thereof carrying the slide last displayed toward the rear of said magazine, means to tilt the slide during its movement toward the rear of the magazine, a shutter in the path of the slide adapted to be operated during the movement of the slide away from the display opening.

7. In a projecting machine, in combination, a magazine, a slide opening arranged above the magazine, rotating means adapted to raise the terminal slide in a plane substantially parallel to the plane of the slide opening and to exposure position in line with said slide opening, said rotating means during the continued movement thereof carrying the slide over the magazine, means to tilt the slide with its lowermost edge directed toward the rear end of the magazine whereby the slide may be moved angularly into the magazine and behind the rearmost slide.

8. In a projecting machine, in combination, a magazine, a plurality of slides standing on end in said magazine, each slide being in surface contact with the slide immediately preceding it, an open ended member at each side of said slides, a slide opening above said magazine, a pair of rotating levers, an arm on each lever, a pin on each arm, said pins during the rotation of the levers moving upwardly and engaging with the members on the terminal slide in the magazine and raising said slide to the slide opening, said arms during their continued movement depositing a slide in the magazine in back of the rearmost magazine, said pins upon the deposit of said slide at the rear of the magazine passing out of engagement with said members and moving into engagement with the members on the terminal slide of the magazine.

9. In a projecting machine, in combination, a magazine, a plurality of slides standing on end in said magazine, an open ended member at each side of said slides, a slide opening, a pair of rotating levers, an arm pivoted on each lever, pins at the forward ends of said levers and springs at the rear ends thereof, said pins during the rotation of the levers moving upwardly and engaging with the members on the terminal slide in the magazine and raising said slide to the slide opening, said arms during their continued movement depositing a slide in the magazine in back of the rearmost magazine, said pins upon the deposit of said slide at the rear of the magazine passing out of engagement with said members and moving into engagement with the members on the terminal slide of the magazine.

10. In a display machine, in combination, a display position, a magazine adapted to hold a multiplicity of articles to be displayed, said articles being arranged in surface contact in the magazine and having ends thereof resting upon a stationary platform, a pair of oppositely spaced levers rotating in unison, each lever carrying at an end thereof a pivoted arm, a socket member on each side of each article to be displayed, the said arms during their movement with the rotating lever engaging the terminal article and raising it to the display position and during the continued rotation thereof carrying the said article to the rear of the magazine and depositing it next to the last most article in said magazine, and means to rotate said levers.

11. In a display machine, in combination, a display position, a magazine adapted to hold a multiplicity of articles to be displayed, a pair of spaced levers pivoted above the upper most edge surface of said articles and adapted to be rotated, arms at both ends of said levers, said arms coacting in pairs, socket members on the articles, said arms during rotation carrying the terminal article from the magazine to the display position and after display depositing said article next to the rearmost article in said magazine and means to rotate said levers.

In testimony whereof I have hereunto set my hand.

OTTO P. R. LEHMANN.